United States Patent
Holt (12)

(10) Patent No.: US 6,324,392 B1
(45) Date of Patent: *Nov. 27, 2001

(54) EMERGENCY LOCATOR AND COMMUNICATOR

(75) Inventor: Brian P. Holt, Melbourne, FL (US)

(73) Assignee: Harris Corporation, Melbourne, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/093,035

(22) Filed: Jun. 8, 1998

(51) Int. Cl.[7] .................................. H04Q 7/32; G01S 1/02
(52) U.S. Cl. ........................... 455/404; 455/456; 455/66; 342/357.1
(58) Field of Search ...................................... 455/456, 457, 455/404, 426, 66, 100, 550, 552, 553, 575, FOR 121, 445, 459; 342/357, 457, 385, 386, 357.1, 357.07; 340/573, 988–995; 701/207, 213

(56) References Cited

U.S. PATENT DOCUMENTS

| 4,725,253 | * | 2/1988 | Politte | 441/89 |
| 5,218,618 | * | 6/1993 | Sagey | 342/457 |
| 5,367,296 | * | 11/1994 | Schell | 455/575 |
| 5,602,903 | * | 2/1997 | LeBlanc | 455/456 |
| 5,815,525 | * | 9/1998 | Smith et al. | 455/553 |
| 5,929,777 | * | 7/1999 | Reynolds | 455/100 |
| 5,959,580 | * | 9/1999 | Maloney et al. | 342/457 |
| 5,999,811 | * | 12/1999 | Molne | 455/552 |
| 6,038,438 | * | 3/2000 | Beeson et al. | 455/456 |
| 6,088,586 | * | 7/2000 | Haverty | 455/456 |

\* cited by examiner

Primary Examiner—Lester G. Kincaid
(74) Attorney, Agent, or Firm—Carter, Ledyard & Milburn

(57) ABSTRACT

A system and method for instantly summoning assistance to the location of an emergency. A mobile unit providing subscriber communications with an operator or emergency service provider includes a beacon signal generator for directing service providers to the location of the emergency. Subscriber communications are established using an existing personal communication system. The beacon signal generator transmits a wideband spread spectrum that is analyzed at receiving stations to determine the location of the mobile unit.

43 Claims, 2 Drawing Sheets

EMERGENCY LOCATOR AND COMMUNICATOR

BACKGROUND OF THE INVENTION

The present invention relates to systems and methods for personal assistance, more specifically, to a system and method for locating and communicating with a person in an emergency.

In recent history, there has been an immense growth in wireless personal communications through systems such as analog cellular, Personal Communications Systems, and Special Mobile Radio. Services implementing such systems operate on band limited frequencies that are licensed for use by the Federal Communications Commission.

Today, there is a great need for low cost, high speed, and accurate systems for summoning and directing assistance to the scene of an emergency from a mobile communication device. For example, the Federal Communications Commission has mandated enhanced 911 capabilities for certain wireless services. Further by way of example, research has shown that a large percentage of buyers and potential buyers of mobile telephones desire to have the telephone only for emergency use. Prior art systems suffer from many drawbacks which make them unsatisfactory for summoning emergency assistance or make them too costly for wide spread public use.

In prior art systems, determining the current location of a mobile subscriber unit for providing emergency assistance is costly, inaccurate, slow, and unreliable. Prior art systems generally locate a mobile subscriber unit using global positioning systems or triangulation of communications signals carrying subscriber voice or data information.

Prior art systems which use a global positioning system for locating a mobile unit suffer from several drawbacks. The mobile subscriber units for such systems are generally expensive and consume significant battery power. Weather or other obstacles may block satellite signals. There is an inherent delay in providing location information to an emergency service provider because the mobile unit must receive and process position signals from global satellites and then transmit the mobile unit's location to a central office for further processing. Location information is not available when the mobile unit is deactivated. Further, global positioning system are generally unreliable or inoperable for determining in-building location.

With triangulation or multilateration of information carrying signals, location information is only available when there is "live" communications from a mobile unit. Prior art multilateration systems such as that offered by Teletrac are not readily adapted to personal locators in that they are expensive, require high transmit power, have short battery life and do not provide voice communication. In addition such systems, either do not offer in-building operation or have poor accuracy in urban situations, particularly when transmission is from the interior of a building.

In systems using the global positioning system or triangulation on the information carrying signal, location information is generally transmitted from the mobile unit to the receive site(s) on a frequency band licensed for subscriber voice or data communication. Bandwidth for personal communications is generally limited. Increasing wireless traffic by including location information decreases the maximum number of concurrent users a system may support thereby decreasing total subscriber revenues of the system.

Accordingly, it is an object of the present invention to provide a novel method and system that overcomes the drawback of the prior art.

It is another object of the present invention to provide a novel personal emergency assistance system that reliably directs service providers to a wireless subscriber.

It is yet another object of the present invention to provide a novel personal emergency assistance system that can be seamlessly integrated with existing personal communication systems.

It is still another object of the present invention to provide a novel method for providing emergency assistance to a wireless mobile telephone subscriber.

It is a further object of the present invention to provide a novel personal emergency communication device for directing assistance to a location of an emergency as identified by the user of the device.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1A:
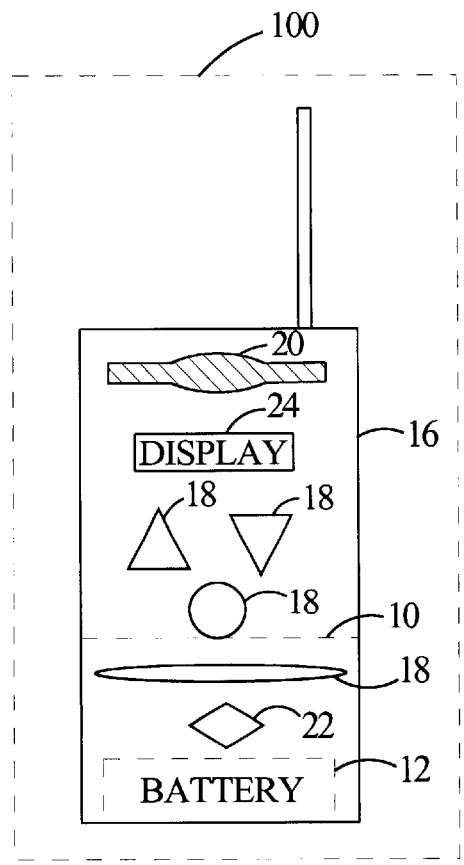
FIGS. 1a and 1b are cross-sectional schematic diagrams of a mobile personal emergency communication device illustrating an embodiment of the present invention.
Figure 1B:
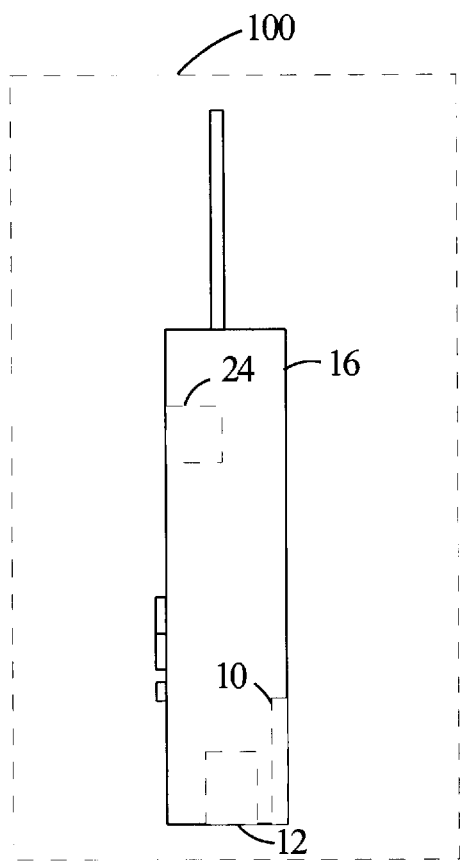

With reference now to FIG. 1, a mobile personal emergency communication device 100 may include a beacon 10, a power supply 12, and a communicator 16. The beacon 10, communicator 16, and power supply 12 may be enclosed in one casing (as shown) or in separate or combined casings. The mobile personal emergency communication device 100 may also include buttons 18, a speaker 20, a microphone 22, and a display 24. The communicator 16 may essentially be a conventional wireless personal communications device.

The device 100 may be used to instantly summon assistance to the location of an emergency 24-hours a day using one-button dialing.

In operation, a user of the device 100 may indicate a need for emergency assistance and the type of emergency assistance needed by pressing one or more of the buttons 18. The communicator 16 may initiate subscriber-to-subscriber type communications with an appropriate service provider. Communications may be established on a narrowband signal. The communicator 16 allows the user to interact with an operator or other individual to which the call is forwarded. The communicator 16 may also be capable of receiving incoming subscriber-to-subscriber type communications.

The beacon 10 may be activated automatically, selectively, or remotely. The beacon is a low power transmitter generating an asynchronous wideband spread spectrum signal for locating the device 100. The level of electrical integration of the beacon 10 and the communicator 16 may depend on the specific application or implementation. Preferably, the beacon 10 operates independent of the communicator 16. Preferably, the beacon 10 and the communicator 16 do not exchange critical timing or control information. The beacon 10 may continue to generate a signal when the communicator 16 is not providing subscriber-to-subscriber type communications. When generated, the beacon signal is preferably asynchronous (i.e., the beacon signal is not synched with a beacon signal recipient). In one embodiment, the beacon 10 and the communicator 16 may share circuitry. The wideband spread spectrum signal generated by the beacon 10 may be on a frequency distinct and isolated from the frequencies assigned to personal communications systems.

The communicator 16 operates on a narrowband signal that may be cellular (including cellular protocols such as AMPS, IS-136, IS-54, etc.) specialized mobile radio, or other analog or digital wireless communication signal. In some embodiments, the communication signal of the communicator 16 may be analog FM, digital FSK or N-FSK signal which can be readily generated by the same circuitry as used to generate the wideband signal. The transmit and receive circuitry of the device 100 would thus be very small and inexpensive. The device 100 may be used in one of the Multi-Lateration System (MLS) sub-bands of the Location and Monitoring Service (LMS) portion of the 902–928 MHz ISM band.

Multilateration techniques may be used on received beacon signals to locate the device 100. With wideband spread spectrum signals, received signal degradation due to multipath effect of urban obstacles such as buildings is minimized. The frequencies selected for the beacon signal may also aid in minimizing signal degradation. Preferably, the beacon 10 generates a signal in a frequency band which propagates well in urban environments and from within buildings.

Figure 2:
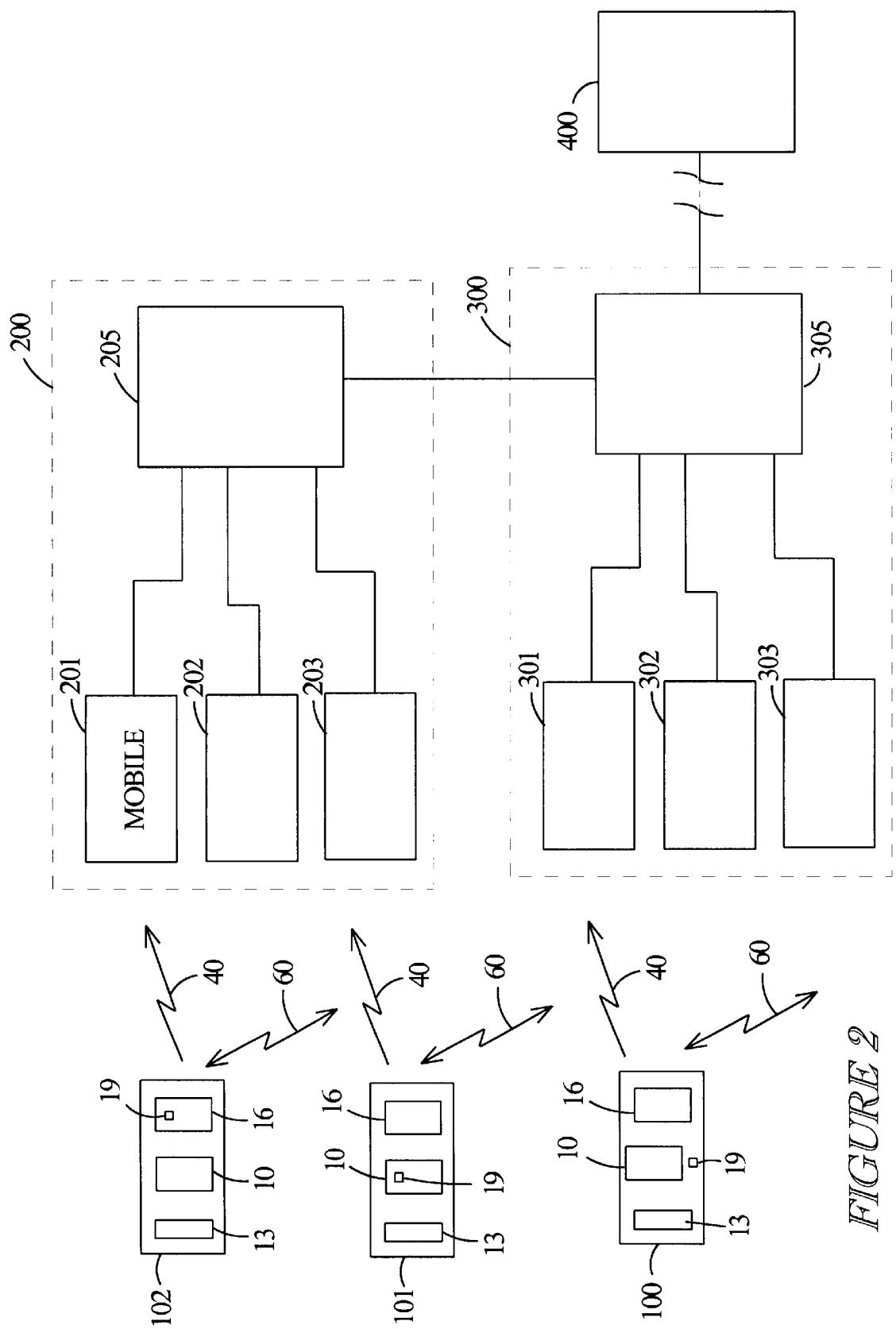
FIG. 2 is a block diagram of a personal emergency assistance system illustrating an embodiment of the present invention.

With reference now to FIG. 2, a personal emergency assistance system may include a mobile personal communication device 100, a locating network 200, and a personal communications network 300.

The device 100 includes a portable power supply 13, a communicator 16 which, in one embodiment, includes a modulator 30 for generating the signal carrying communication information a beacon signal generator 10 (i.e., beacon) which, in one embodiment, includes a modulator 31 for generating the wide band spread spectrum signal and switch 19 for activating the beacon signal generator 10. In other embodiments, the switch may also be at the communicator 16 or the beacon signal generator 10 (See devices 101 and 102).

The locating network 200 includes plural receiving stations. For example, three receiving stations 201, 202, and 203 are illustrated. The receiving stations may be mobile. The locating network may include a node 205 for processing.

The communications network 300 may be a conventional personal communication system. The system includes plural base stations. For example, three base stations 301, 302, and 303 are illustrated. The system may include a central office 305. Communications between a base station and the central office 305 may be established through methods known in the art.

In operation, a user of a device 100 may be in an emergency or may wish to indicate the existence of an emergency. The beacon signal generator 10 of device 100 may be selectively activated from the device 100, the communications network 300, or an emergency service provider 400. Two-way voice or data communications may be established with the communicator 16. The beacon signal generator 10 may be responsive to the communicator 16.

The two-way voice or data communications is established with communications network 300. The central office 305 may include an operator or an automatic router for directing communications to an appropriate emergency service provider. For automatic routing, a user may indicate the type of emergency at the device 100. Preferably, communications between the device 100 and the communication network 300 are on a narrowband signal 60 using a conventional personal communications protocol.

When activated, the beacon signal generator 10 generates a wideband spread spectrum homing signal 40. The locating network 200 may use a multilateration technique at the node 205 to determine the location of the device from the time of arrival, angle of arrival, or a combination of the time and angle of arrival of the beacon signal at the receiving stations. Using multilateration techniques on wideband spread spectrum signal provides a reliable and accurate determination of device location in dense urban environment. The node 205 may also act as an interface between the locating network 200 and the communications network 300. In one embodiment, the node 205 may collect data from the stations and provide the collected data to the communication network 300 for further processing.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A mobile personal emergency communication device for directing assistance to an emergency identified by a user of the device comprising:
   a communicator for providing interactive communications between the user and a service having:
   a transceiver for receiving from and transmitting to the service a signal carrying communication information in accord with a conventional personal communications protocol;
   a beacon for directing the service to the geographic location of the device having:
   a transmitter for selectively transmitting a wide band spread spectrum signal independent of the operation of said communicator wherein said wide band spread spectrum signal is transmitted in a band separate and distinct from frequencies assigned to personal communications systems, and a portable power supply for providing power to the beacon and communicator.

2. The mobile personal emergency communication device of claim 1 wherein said communicator includes a means for selecting a type of service.

3. The mobile personal emergency communication device of claim 1 wherein said transmitter for selectively transmitting a wide band spread spectrum signal transmits a beacon signal in a broad bandwidth in comparison to that of the signal carrying communication information.

4. The mobile personal emergency communication device of claim 3 wherein said transceiver for receiving from and transmitting to the service a signal carrying communication information operates in a conventional personal communications channel.

5. The mobile personal emergency communication device of claim 1 wherein said beacon includes a first modulator for generating the wide band spread spectrum signal and said transceiver includes a second modulator for generating the signal carrying communication information.

6. The mobile personal emergency communication device of claim 5 wherein said first modulator employs a type of modulation different from a type of modulation employed by said second modulator.

7. The mobile personal emergency communication device of claim 1 wherein said communicator and said beacon share circuitry.

8. The mobile personal emergency communication device of claim 1 wherein the device is hand-held.

9. The mobile personal emergency communication device of claim 1 wherein said beacon is responsive to said communicator.

10. The mobile personal emergency communication device of claim 1 further comprising a means for the service to activate said beacon.

11. The mobile personal emergency communication device of claim 1 wherein said beacon includes a means for activating said transmitter.

12. The mobile personal emergency communication device of claim 1 wherein said communicator includes a means for the user to activate the beacon.

13. A personal emergency assistance system for directing appropriate assistance to an emergency, comprising:
a personal telecommunication device having:
a communicator for providing two-way voice and data communications signals on a conventional telecommunications frequency, and
a generator for generating a beaconing signal directing assistance to a location of the device, wherein said beaconing signal is a wide band spread spectrum signal transmitted in a band separate and distinct from frequencies assigned to personal communications systems,
a first network of stations for providing two-way voice and data communications with said personal telecommunication device and for reaching an appropriate emergency assistance provider and for providing location information of said personal telecommunication device to the assistance provider; and
a second network of stations situated to receive the beaconing signal for locating said personal telecommunication device from the characteristics of the beaconing signal and for providing location information to said first network.

14. The personal emergency assistance system of claim 13 wherein said personal telecommunication device is portable.

15. The personal emergency assistance system of claim 14 wherein the personal telecommunication device includes a power supply for powering said generator and said communicator.

16. The personal emergency assistance system of claim 13, said personal telecommunication device includes a switch for selectively activating said generator.

17. The personal emergency assistance system of claim 16, wherein said switch is at said generator.

18. The personal emergency assistance system of claim 17, wherein said switch is responsive to said communicator.

19. The personal emergency assistance system of claim 17, wherein said switch is responsive to the assistance provider.

20. The personal emergency assistance system of claim 16, wherein said switch is at said communicator.

21. The personal emergency assistance system of claim 20, switch is responsive to the assistance provider.

22. The personal emergency assistance system of claim 13 wherein said generator generates an asynchronous wideband spread spectrum signal as the beaconing signal.

23. The personal emergency assistance system of claim 13 wherein said second network of stations includes a station having mobility.

24. The personal emergency assistance system of claim 13 wherein said second network comprises:
a central office operatively connected to a plurality of stations for locating said personal telecommunication device from the characteristics of the beaconing signal received at the stations.

25. The personal emergency assistance system of claim 24 wherein said central office locates said personal telecommunication device from the time of arrival of a beaconing signal received at the stations.

26. The personal emergency assistance system of claim 24 wherein said central office locates said personal telecommunication device from the angle of arrival of a beaconing signal received at the stations.

27. The personal emergency assistance system of claim 24 wherein said central office locates said personal telecommunication device from the angle and time of arrival of a beaconing signal received at the stations.

28. The personal emergency assistance system of claim 13 wherein said first network includes a router responsive to said personal telecommunication device for automatically providing a communication path to the appropriate emergency assistance provider.

29. The personal emergency assistance system of claim 13 wherein said first network comprises an existing telecommunications infrastructure for providing personal communications services to consumers.

30. The personal emergency assistance system of claim 13 wherein said second network comprises stations dedicated to providing personal emergency assistance.

31. The personal emergency assistance system of claim 13 wherein said generator and said communicator share circuitry.

32. The personal emergency assistance system of claim 13 wherein said first network and said second network share infrastructure.

33. A method for providing assistance for a person in an emergency comprising the steps of:
(a) indicating a need for assistance using a personal telecommunications device;
(b) transmitting a homing signal from the personal telecommunication device on a wideband spread spectrum signal in a frequency band not assigned to personal communications systems;
(c) providing voice and data communications between the personal telecommunications device and a recipient of the assistance indication, wherein said voice and data communications are transmitted in a band separate and distinct from the homing signal;
(d) locating the personal telecommunications device from the characteristics of the homing signal; and
(e) directing appropriate assistance to the location of the personal telecommunications device.

34. The method of claim 33 wherein the step of locating the personal telecommunications device comprises the step of determining a time of arrival of the homing signal at a plurality of antennas.

35. The method of claim 33 wherein the step of locating the personal telecommunications device comprises the step of determining an angle of arrival of the homing signal at a plurality of antennas.

36. The method of claim 33 wherein the step of locating the personal telecommunications device comprises the step of determining time and angle of arrival of the homing signal at a plurality of antennas.

37. The method of claim 33 wherein the step of locating the personal telecommunications device is performed using multilateration.

38. The method of claim 33 wherein the homing signal is asynchronously transmitted.

39. The method of claim 33 wherein the step of transmitting a homing signal is performed independent of the step of providing voice and data communications.

40. The method of claim 33 wherein the step of transmitting a homing signal is responsive to the step of providing voice and data communications.

41. The method of claim 33 wherein the recipient of the assistance indication is an operator.

42. The method of claim 33 wherein the recipient of the assistance indication is an automated operator.

43. The method of claim 33 wherein the recipient of the assistance indication is an emergency assistance service provider.

* * * * *